July 16, 1963

R. D. MOORE 3,097,863

STEERABLE TRAILER VEHICLE

Filed March 1, 1961

INVENTOR.
RONALD D. MOORE

BY

ATTORNEYS

July 16, 1963

R. D. MOORE 3,097,863

STEERABLE TRAILER VEHICLE

Filed March 1, 1961

INVENTOR.
RONALD D. MOORE

BY

ATTORNEYS

3,097,863
STEERABLE TRAILER VEHICLE
Ronald D. Moore, Saginaw, Mich., assignor to Saginaw Products Corporation, Saginaw, Mich., a corporation of Michigan
Filed Mar. 1, 1961, Ser. No. 92,548
13 Claims. (Cl. 280—445)

This invention relates to trailer vehicles having steerable wheels yieldably suspended from the vehicle frame in tandem and provided with steering that is adapted for either automatic operation or manual operation, depending on whether the trailer is connected to or disconnected from a towing vehicle.

A trailer vehicle of the general class to which the invention relates is adapted particularly for use in transporting very heavy loads from place to place. Such a vehicle conventionally is provided with a drawbar adapted for connection to a towing vehicle and operable in response to turning movements of the towing vehicle to effect turning of the trailer's steerable wheels. In many instances it is not possible to locate a trailer in the precise position desired without disconnecting it from the towing vehicle. If the trailer is not in the desired position when it is disconnected from its towing vehicle, considerable difficulty has been experienced in the past in attempting to manipulate manually the trailer's steering mechanism during final adjustment of the trailer's position. The difficulty in manually manipulating the trailer's steering mechanism is compounded in those instances where the trailer is heavily loaded.

Trailer vehicles adapted to carry heavy loads conventionally are provided with multiple axles arranged in tandem so as to distribute the load substantially uniformly over the entire length of the vehicle. In order to cushion the load against shocks caused by rough pavement and the like, it is customary to provide yieldable suspension means reacting between the axles and the trailer frame for permitting relative vertical movement between the axles and the frame. In those instances where a vehicle is provided with tandem steerable axles and yieldable suspension means for those axles, vertical movement of one of the axles relative to the other can impose on the steering mechanism stresses of such magnitude as to be capable of seriously damaging the steering mechanism unless such stresses are compensated for in some manner.

An object of this invention is to provide a vehicle having steerable wheels capable of being actuated by either a drawbar adapted for connection to a towing vehicle or by auxiliary steering means reacting between the steerable axle and the vehicle frame.

Another object of the invention is to provide auxiliary steering mechanism for a vehicle of the kind referred to which is selectively engageable and disengageable from the steering apparatus.

A further object of the invention is to provide a trailer vehicle having tandem steerable wheels and in which all sets of steerable wheels may be operated selectively either by turning of a pivoted drawbar or by auxiliary steering mechanism adapted to react between the vehicle frame and the drawbar steering mechanism.

Another object of the invention is to provide a trailer vehicle having tandem steerable axles of the kind referred to and wherein the axles are yieldably suspended from the vehicle frame so as to be capable of vertical movement relative to one another and to the frame.

A further object of the invention is to provide steering means interconnecting the steerable axles of a tandem axle trailer vehicle of the kind described and provided with means for shiftably mounting the interconnecting steering means so as to prevent its being subjected to damaging forces caused by relative vertical movement of the axles.

Other objects and advantages of the invention will be pointed out specifically or will become apparent from the following description when it is considered in conjunction with the appended claims and the accompanying drawings, wherein:

Figure 1:
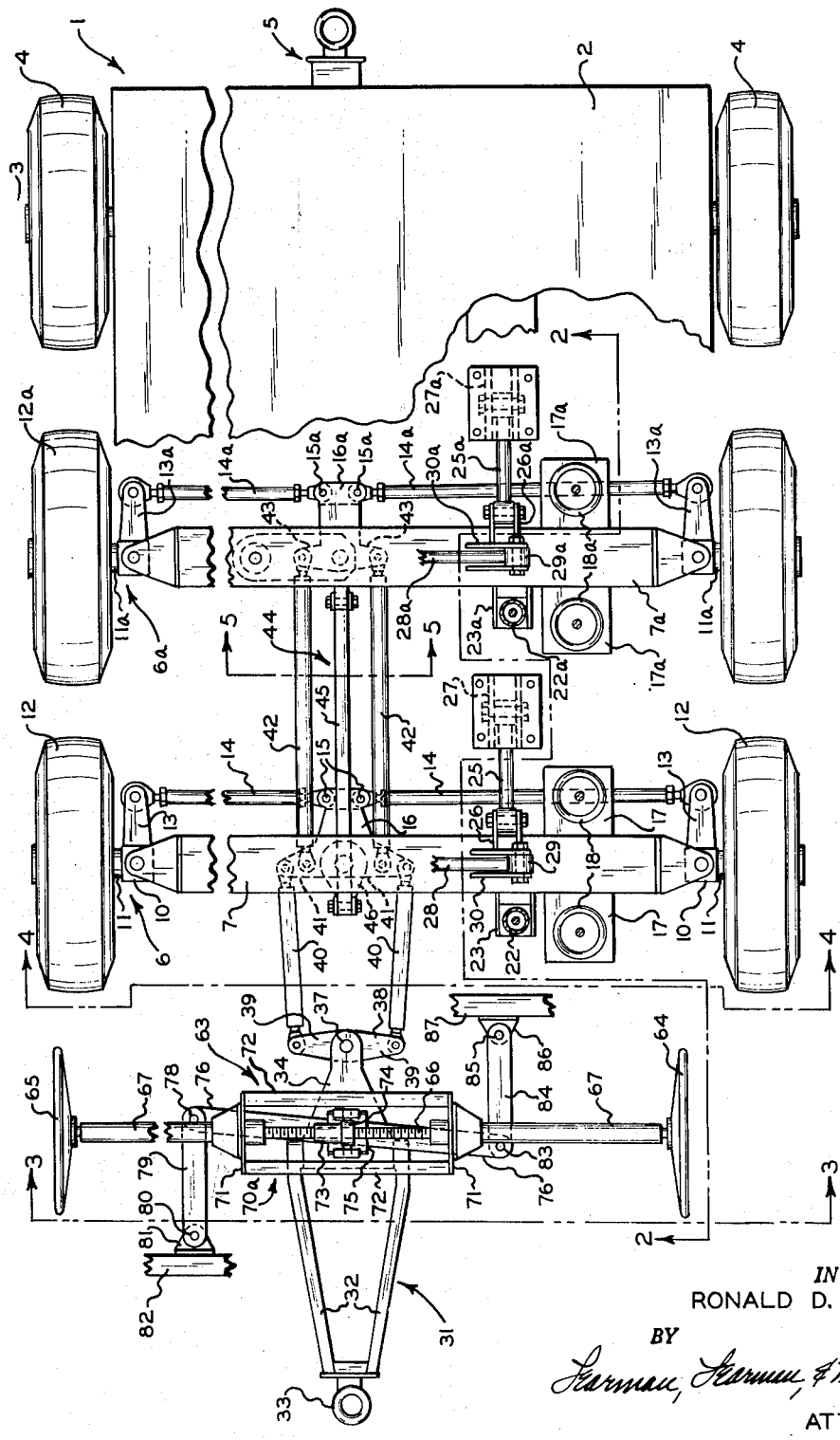
FIGURE 1 is a fragmentary, top plan view of a trailer vehicle constructed in accordance with the invention, with parts of the frame being broken away to illustrate the steering and suspension mechanisms of the vehicle.

A trailer vehicle constructed in accordance with the invention is designated generally by the reference character 1 and comprises a frame 2 which is only fragmentarily disclosed in the drawings inasmuch as it is conventional and forms no part of the invention per se. Adjacent the rear end of the frame 2 is provided a plurality of tandem axles 3, only one of which is shown in FIGURE 1, and which may be yieldably suspended from the frame in any one of a number of conventional ways so as to provide non-steerable journals for wheels 4. If desired, the rear end of the frame may be equipped with a hitch device 5 of conventional construction so as to permit the rear end of the vehicle to be coupled to another trailer.

Adjacent the forward end of the frame is provided forward or leading steerable axle means designated generally by the reference character 6. The leading apparatus 6 comprises a bolster 7 extending transversely of the frame 2 and having a clevis 8 at each end thereof in which is rotatably mounted a king pin 9. To each king pin is fixed a bushing 10 provided at the end of a stub axle 11 on which a wheel 12 is journaled. The arrangement is such that each wheel 12 is swivelable about the axis of its associated king pin 9 so as to partake of steering movements.

To each bushing 10 is fixed one end of a lever 13, the other end of each of which is pivoted to one end of a transversely extending tie rod 14. Adjacent the longitudinal center of the vehicle frame, the adjacent ends of the tie rods 14 are pivoted as at 15 to a steering member or plate 16 which is pivotally mounted in a manner which will be pointed out in more detail hereinafter. For the present, it is sufficient to state that pivotal movement of the plate 16 will cause lateral movement of the tie rods 14 so as to effect simultaneous swiveling or steering movements of the wheels 12.

Rearward of the assembly 6 is a trailing steerable axle means 6a. The trailing assembly is composed of elements similar to those just described, and the parts of the apparatus 6a corresponding to the parts of the apparatus 6 are designated by the same reference characters, followed by the suffix a.

Means, including the bolsters 7 and 7a, is provided for yieldably suspending each of the axle assemblies from the frame. The suspension means for the leading axle assembly 6 comprises a pair of spring seats 17 welded or otherwise suitably fixed adjacent each end of the bolster 7 and against each of which the lower end of a coil spring 18 seats. The upper end of each coil spring bears against a member 19 forming part of the frame 2. If desired, a snubbing device 20 may be received within the convolutions of each spring 18 and be secured by a bolt 21. The bolster 7 may be provided with a pair of conventional, telescoping shock absorbers 22 adjacent each end thereof, the lower end of each shock absorber being secured to a bracket 23 welded to the bolster 7 and the upper end of each shock absorber being secured to a plate 24 welded to the frame member 19.

The suspension means for the apparatus 6 also includes, adjacent each end of the bolster 7, a pair of vertically spaced radius rods 25 extending longitudinally of the vehicle frame and pivoted at their forward ends to brackets 26 welded to the bolster 7 and pivoted at their rearward ends to a bracket 27 that is welded to and depends from the frame 2.

The construction and arrangement of the suspension parts are such that the bolster 7, together with the axles 11 and wheels 12, are capable of vertical movements relative to the frame 2 so as to cushion a load supported on the frame. The wheels 12 also are capable of vertical movements in opposite directions. Stated differently, the bolster 7 is capable of tilting in a substantially vertical plane. To compensate for this capability, a laterally extending sway bar 28 may be pivoted at its opposite ends to spherical bearings 29 supported in brackets 30 welded to the upper surface of the bolster 7.

The rearward steerable axle assembly 6a is provided with yieldable suspension means similar to that described in connection with the axle assembly 6 and corresponding parts are indicated by corresponding reference characters, followed by the suffix a. The axle assembly 6a, therefore, is capable of moving relatively to the frame 2 in the same manner as is the assembly 6, but the two assemblies are individually suspended so as to be independent of one another.

Figure 2:
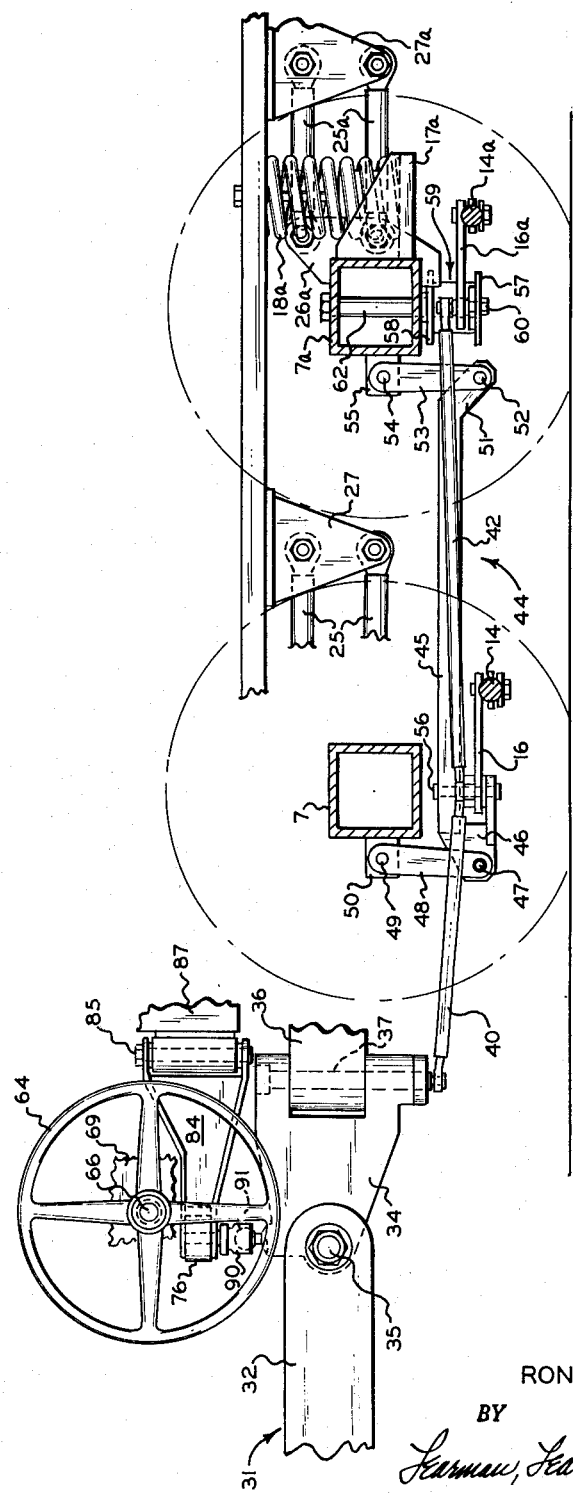
FIGURE 2 is a fragmentary, enlarged longitudinal sectional view taken on the line 2—2 of FIGURE 1.
Figure 3:
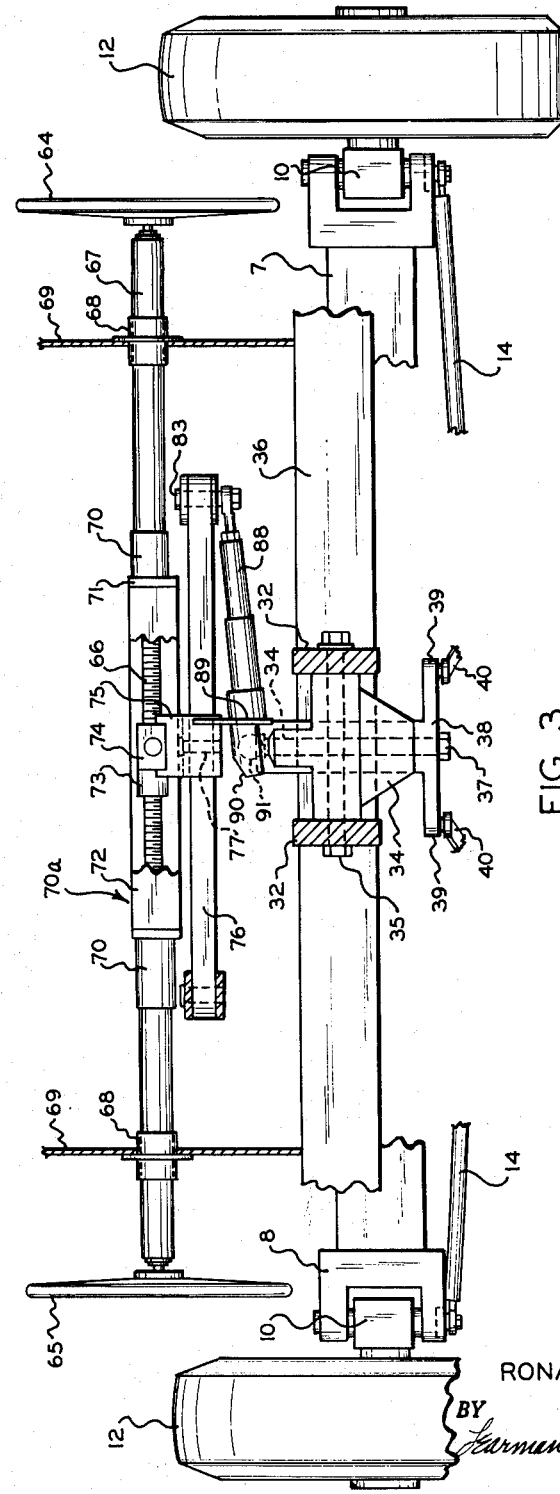
FIGURE 3 is a transverse, sectional view taken on the line 3—3 of FIGURE 1 and particularly illustrating the auxiliary steering mechanism.
Figure 4:
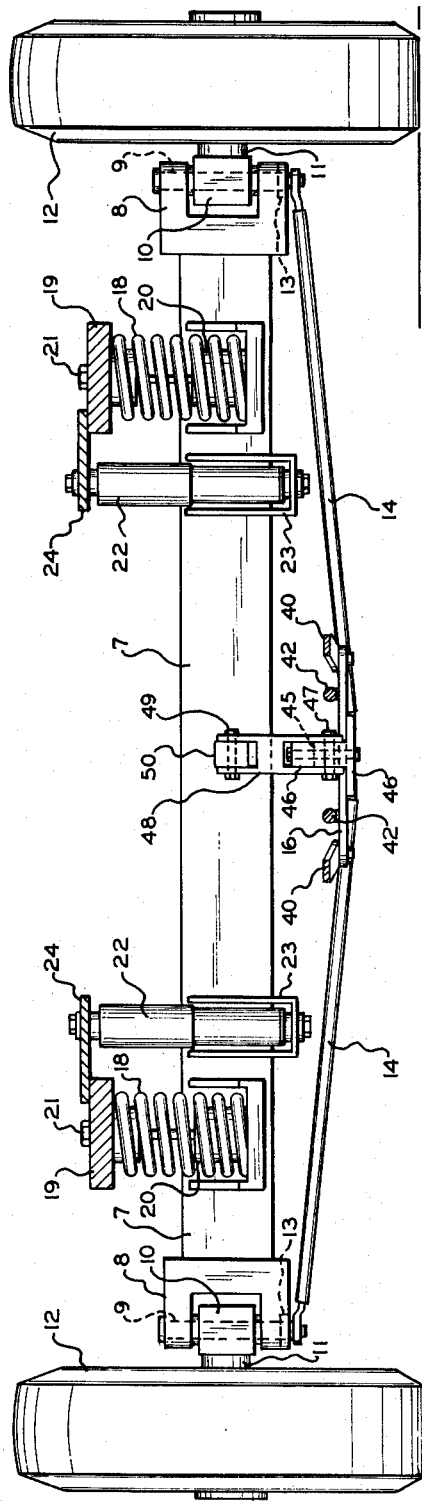
FIGURE 4 is a transverse, sectional view taken on the line 4—4 of FIGURE 1.
Figure 5:
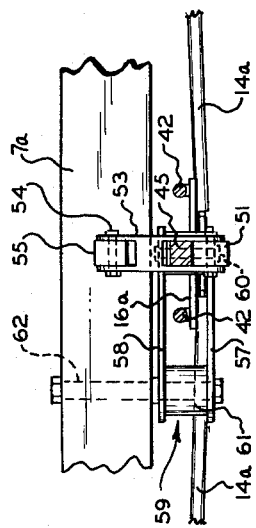
FIGURE 5 is a sectional view taken on the line 5—5 of FIGURE 1.

Referring now particularly to FIGURES 1, 2, and 3, the steering apparatus includes a drawbar 31 comprising a pair of arms 32 joined at their leading ends to a hitch element 33 that is adapted to be connected to a towing vehicle, the rearward ends of the arms 32 being pivoted to a clevis member 34 by means of a horizontally positioned bolt 35. The clevis member 34 is pivotally mounted for movements in a horizontal plane on a frame member 36 by means of a pivot pin 37. To the lower surface of the clevis member 34 is welded or otherwise suitably fixed a lever 38 having two arms 39 normally extending transversely of the vehicle frame. The arrangement of the steering parts thus far described is such that the drawbar 31 and its associated parts are capable of pivoting about the axis of the pin 37 so as to cause rocking in one direction or the other of the lever 38.

Means is provided for transmitting the motion of the drawbar to the axle assembly 6 and comprises a pair of connecting rods 40 pivoted at their forward ends to the arms 39 of the lever 38 and pivoted at their rearward ends to laterally extending wings or arms 41 forming integral parts of the plate 16. The arrangement is such that clockwise rocking of the lever 38 will cause corresponding rocking of the plate 16 and such movement of the gate 16 will be transmitted to the axles 11 to cause their associated wheels 12 to swivel in a clockwise direction.

Additional means is provided to transmit the motion of the drawbar to the rearward axle assemblies 6a and comprises a pair of connecting rods 42 pivoted at their forward ends to the wings 41 of the plate 16 and pivoted at their rearward ends to wings 43 forming integral parts of the plate 16a. Upon rotation of the plate 16 in a clockwise direction, for example, the connecting rods 42 will cause corresponding rotation of the plate 16a so as to cause the tie rods 14a to swivel the axles 11a and their associated wheels in a clockwise direction.

Means designated generally by the reference character 44 is provided to support the motion transmission means and to compensate for the tendency of strains to be imposed thereon during vertical movements of the axle assemblies relative to the vehicle frame and to one another. The supporting and compensating means 44 comprises a bar 45 extending fore and aft of the vehicle frame and located at the longitudinal axis of the latter. The forward end of the bar 45 is welded or otherwise suitably fixed to a bracket 46 which is pivoted as at 47 to a generally vertical link 48 which, in turn, is pivoted as at 49 to an ear 50 which is welded to the forward surface of the bolster 7. The rear end of the bar 45 is provided with a downwardly inclined portion 51 which is pivoted as at 52 to a generally vertical link 53, the latter being pivoted as at 54 to an ear 55 that is welded to the forward surface of the bolster 7a. The forward steering arm or plate 16 is pivotally connected to the supporting means by a pivot pin 56 which passes through aligned openings formed in the plate 16, and in the rod 45 and in the bracket 46. The rear steering arm or plate 16a is received between two arms 57 and 58 of a double arm link 59 and is pivotally mounted to the arms by a pin 60 which passes through openings formed in both of the arms and in the plate 16a. The two arms 57 and 58 are joined to a spacing sleeve 61 which is pivotally received on a post 62 which is fixed to and depends from the bolster 7a.

The construction and arrangement of the supporting and compensating means 44 are such that both sets of motion transmitting links 40 and 42 are capable of movement fore and aft of the vehicle frame when the need for such movement arises. One instance in which fore or aft movement of the steering rod assembly is required occurs whenever one set of steerable wheels moves vertically relatively to the other. For example, should the leading wheels 12 drop into a depression during movement of the vehicle, the leading wheels will be capable of moving downwardly relatively to the frame. Downward movement of the leading set of wheels from the position shown in FIGURE 2 would exert a force on the links 40 tending to elongate them and a similar force would be exerted on the links 42 tending to elongate them. Since both sets of links 40 and 42 are connected to the supporting bar 45, and since the links 42 are connected to the pivoted lever 59, both sets of links 40 and 42 may move forwardly so as to avoid the imposition of excessive strains on either the links themselves or on the clevis member 34. Substantially the same action results upon downward movement of the trailing set of wheels 12a relative to the frame, but in this instance the lever 59 alone would be capable of compensating for the tendency of the rods 42 to elongate. Upward movement of either set of wheels relatively to the frame is compensated for in substantially the same manner except that upward movement of the wheels causes the supporting apparatus to shift rearwardly rather than forwardly.

The condition of the apparatus as it is disclosed in the drawings is such as to permit the steering mechanism to be actuated without regard to movements of a towing vehicle. In other words, the trailer is disconnected from its towing vehicle. Actuating means designated generally by the reference character 63 is provided to effect manipulation of the draw bar 31 and consequent operation of the steering mechanism when the trailer is separated from a tow vehicle. The actuating means comprises a pair of manually operable steering wheels 64 and 65 fixed at opposite ends of a threaded shaft 66 that extends transversely of the vehicle frame. The outer ends of the shaft 66 are enclosed within sleeves 67 and the sleeves are in turn received in supports 68 which are welded or otherwise suitably fixed to portions 69 of the vehicle frame 2. The inner ends of the sleeves 67 are fixed to supports 70 which are welded or otherwise suitably secured to a substantially rectangular frame 70a composed of longitudinally extending members 71 joined at corresponding ends to transversely extending frame members 72.

At substantially the longitudinal axis of the frame is located a ball nut 73 which rotatably receives the threaded shaft 66. The nut 73 is not rotatable on the shaft 66. Instead, the nut 73 is rigidly joined by means of a clamp 74 to a bracket 75 which in turn is pivoted on a transversely extending lever 76 by means of a pivot pin 77. The pin 77 is located precisely at the center of the lever 76 and at the longitudinal axis of the frame. One end of the lever 76 is pivoted as at 78 to one end of a link 79, the other end of the latter being pivoted as at 80 to a support 81 that is fixed to a member 82 of the frame. The opposite end of the lever 76 is pivoted as at 83 to one end of a link 84. The opposite end of the link 84 is pivoted as at 85 to a bracket 86 that is supported on a member 87 forming part of the trailer frame.

As is best indicated in FIGURE 3, the pivot pin 83 at one end of the lever 76 depends below the latter and is pivotally joined to one end of a force transmitting link 88. The other end of the link 88 extends through a hanger 89 that depends from the bracket 75. This end of the link 88 is provided with a socket member 90 that is adapted removably to be coupled with a ball element 91 that is fixed to the clevis device 34.

It will be apparent from FIGURE 2 that the coupling elements 90 and 91 are located forwardly of the pivotal axis of the clevis device 34. As a consequence, a lateral force exerted on the coupling ball 91 by the link 88 will cause pivoting movement of the clevis 34 about the axis of the pin 37.

When the actuating mechanism 63 is connected in the manner indicated in the drawings, rotation of one of the steering wheels 64, 65 will cause rotation of the shaft 66. Since the nut 73 is restrained against rotation, it will move longitudinally of the shaft 66 in one direction or the other, depending on the direction of rotation of the steering wheel. The movement of the nut 73 longitudinally of the shaft will be transmitted to the lever 76 so as to cause it to be shifted laterally of the vehicle frame. As the lever 76 moves laterally, the links 79 and 84 will rock relatively to the lever 76 and to their respective frame elements 82 and 87, and the lever 76 also will rock about the axis of the pivot pin 77 so as to prevent binding of the parts. The lateral movement of the lever 76 will be imparted to the force transmitting link 88 so as to impart pivotal movements to the steering mechanism. Thus, straight line or reciprocating movement of the nut 73 is converted to rocking movement of the drawbar 31 so as to actuate the steering mechanism.

When it is desired to couple the trailer 1 to a towing vehicle, the force transmitting link is disconnected from the steering mechanism and the drawbar 31 is connected to the tow vehicle in the conventional manner. In the illustrative embodiment of the invention, disconnection of the link 88 from the steering mechanism is effected by separation of the socket member 90 from the ball member 91. The same result could be achieved, however, by disconnecting the link 88 from its pivot pin 83. In either event, disconnection of the link 88 from the actuating or steering mechanism enables turning movements of the towing vehicle to impart steering movements to the steerable wheels of the trailer by rotating the clevis 34.

The disclosed embodiment is representative of a presently preferred form of the invention, but is intended to be illustrative rather than definitive thereof. The invention is defined in the claims.

I claim:

1. Steering apparatus for a vehicle comprising frame means; axle means extending laterally of said frame means and swivelably mounted on said frame means for steering movements; drawbar means; means pivotally mounting said drawbar means on said frame means; motion transmitting means interconnecting said drawbar means and said axle means for swivelling the latter in response to pivoting of said drawbar means; and means mounting said motion transmitting means for movement relative to said axle means and fore and aft of said frame means.

2. Steering apparatus for a vehicle comprising frame means; axle means swivelably mounted on said frame means for steering movements; drawbar means; means pivotally mounting said drawbar means on said frame means; motion transmitting means interconnecting said drawbar means and said axle means for swiveling the latter in response to pivoting of said drawbar means; actuating means mounted on said frame means for reciprocating movements along a path extending laterally of said frame means; force transmitting means operable when connected to said drawbar means and said actuating means to convert reciprocating movements of the latter to pivotal movements of said drawbar means; and separable means operable selectively to interconnect and disconnect said drawbar means and said actuating means.

3. Steering apparatus for a vehicle comprising frame means; first swivelable axle means; first means yieldably suspending said first axle means from said frame means; second swivelable axle means; second means yieldably suspending said second axle means from said frame means in tandem with said first axle means; drawbar means; means pivotally mounting said drawbar means on said frame means; first motion transmission means interconnecting said drawbar means and said first axle means for swivelling the latter in response to pivoting of said drawbar means; second motion transmitting means interconnecting said first motion transmitting means and said second axle means for swivelling the latter in response to pivoting of said drawbar means; force transmitting means reacting between said frame means and said drawbar means for pivoting the latter; and support means interconnecting at least one of said yieldable suspension means to both of said first and second motion transmission means.

4. Apparatus as set forth in claim 3 wherein said support means is movably connected to both of said yieldable suspension means for movements longitudinally of said frame means.

5. A steerable vehicle comprising frame means; first swivelable axle means; first means yieldably suspending said first steerable axle means from said frame means; second swivelable axle means; second means yieldably suspending said second axle means from said frame; steering means operatively connected to said first axle means for swiveling the latter; motion transmitting means interconnecting said first and second axle means for swiveling said second axle means in response to swiveling of said first axle means; support means; means connecting said support means to said motion transmitting means; and means connecting said support means to said first and second suspension means for movements relative thereto.

6. A vehicle as set forth in claim 5 wherein said support means comprises a member extending longitudinally of said vehicle between said first and second suspension means and being swingably connected adjacent its opposite ends to the respective suspension means.

7. A steerable vehicle comprising frame means; first swivelable axle means; first yieldable means suspending said first axle means from said frame means; second swivelable axle means; second yieldable means suspending said second axle means from said frame means in tandem with said first axle means; drawbar means adapted for connection to a towing vehicle; means pivotally mounting said drawbar means on said frame means; first motion transmission means interconnecting said drawbar means and said first axle means for swiveling the latter in response to pivoting of said drawbar means; second motion transmission means interconnecting said first motion transmission means and said second axle means for swiveling the latter in response to pivoting of said drawbar means; manually operable steering means mounted on said frame means; force transmitting means operatively connected to said steering means; disconnectable means separably connecting said force transmitting means to said drawbar means for pivoting the latter, said force transmitting means being disconnected from said drawbar means when the latter is conditioned for connection to a towing vehicle; supporting means interconnecting said first and second suspension means with said first and second motion transmission means; and means mounting said supporting means on said first and second suspension means for movements relative thereto.

8. Apparatus as set forth in claim 7 wherein the last mentioned mounting means a pair of generally parallel links pivoted respectively to said first and second suspension means and to said support means.

9. A steerable vehicle comprising frame means; first and second steerable axle means; first and second yieldable suspension means respectively connected to said first and second axle means and suspending them from said frame means in tandem; steering means movably supported by said frame means; first motion transmission means interconnecting said steering means and said first axle means for imparting steering movements to the latter; second motion transmission means interconnecting said first motion transmission and said second axle means for imparting steering movements to the latter; first supporting means connected to said first and second motion transmission means and swingably connected to said first and second suspension means for movements fore and aft of said frame means; and second supporting means swingably interconnecting said second motion transmission means and said second suspension means for movements fore and aft of said frame means.

10. A steerable vehicle including frame means; first swivelable support wheel means suspended therefrom; second swivelable support wheel means suspended from said frame means behind said first wheel means; steering motion transmitting means interconnecting said first and second wheel means for swiveling said second wheel means in response to swiveling of said first wheel means; support means for said steering motion transmitting means; means connecting said support means to said steering motion transmitting means; and means mounting said support means for movement fore and aft.

11. Steering apparatus for a vehicle comprising frame means; first swivelable axle means; first means yieldably suspending said first axle means from said frame means; second swivelable axle means; second means yieldably suspending said second axle means from said frame means in tandem with said first axle means; drawbar means; means pivotally mounting said drawbar means on said frame means; first motion transmission means interconnecting said drawbar means and said first axle means for swivelling the latter in response to pivoting of said drawbar means; second motion transmission means interconnecting said first motion transmitting means and said second axle means for swivelling the latter in response to pivoting of said drawbar means; and support means interconnecting at least one of said yieldable suspension means to both of said first and second motion transmission means.

12. Steering apparatus for a vehicle comprising frame means; axle means swivelly mounted on said frame means for steering movements; a steering member pivotally mounted on said frame means; motion transmitting means interconnecting said steering member and said axle means for swiveling the latter in response to pivotal movements of said steering member; rockable lever means mounted on said frame means for movements laterally thereof; link means pivotally interconnecting said lever means and said steering member for pivoting the latter in response to lateral movement of said lever means; and means connected to said lever means for moving the latter laterally of said frame means.

13. Steering apparatus for a vehicle comprising frame means; axle means extending laterally of said frame means and swivelably mounted thereon for steering movements; drawbar means; means pivotally mounting said drawbar means on said frame means; motion transmission means comprising a pair of links connected at corresponding ends to said drawbar means for simultaneous movements fore and aft of said frame in opposite directions in response to pivotal movement of said drawbar means; means connecting said links to said axle means for swiveling the latter in response to pivotal movement of said drawbar means; and means mounting said links for simultaneous movement thereof in the same direction fore and aft of said frame means.

References Cited in the file of this patent

UNITED STATES PATENTS

| 1,321,449 | Hudson | Nov. 11, 1919 |
| 1,752,638 | Johnson | Apr. 1, 1930 |
| 2,383,216 | Runyan | Aug. 21, 1945 |
| 2,930,631 | Voorhees | Mar. 29, 1960 |

FOREIGN PATENTS

| 5,983 | Great Britain | of 1906 |
| 849,808 | France | Aug. 28, 1939 |
| 405,399 | Italy | Aug. 10, 1943 |